United States Patent [19] [11] 3,755,258
Tiedeman [45] Aug. 28, 1973

[54] RAPID CURING RESIN COMPOSITIONS COMPRISING A PHENOL-ALDEHYDE CONDENSATION POLYMER MODIFIED WITH AN ACYL HYDRAZIDE

[75] Inventor: George T. Tiedeman, Seattle, Wash.

[73] Assignee: Weyerhaeuser Company, Tacoma, Wash.

[22] Filed: May 25, 1971

[21] Appl. No.: 146,784

[52] U.S. Cl.............. 260/59, 161/205, 161/215, 161/257, 161/262, 260/29.3, 260/33.4 R, 260/51.5, 260/64, 260/67.6 R, 260/70 R, 260/831
[51] Int. Cl............................ C08g 5/18, C08g 9/04
[58] Field of Search............................ 260/51.5, 59

[56] References Cited
UNITED STATES PATENTS

| | | | |
|---|---|---|---|
| 3,364,179 | 1/1968 | Kirkpatrick | 260/51.5 |
| 3,376,262 | 4/1968 | Pasky | 260/59 |
| 3,377,317 | 4/1968 | Hoxie | 260/59 |
| 3,398,122 | 8/1968 | Shephard et al. | 260/59 X |
| 3,436,373 | 4/1969 | Cox et al. | 260/51.5 |
| 3,444,137 | 5/1969 | Higginbottom | 260/51.5 |
| 3,459,708 | 8/1969 | Stevens | 260/59 |
| 3,461,099 | 8/1969 | Muzyczko et al. | 260/59 |
| 3,487,046 | 12/1969 | Negrevergive | 260/51.5 |
| 3,509,096 | 4/1970 | Sobel | 260/51.5 |
| 3,546,172 | 12/1970 | Johnson et al. | 260/51.5 |
| 3,558,559 | 1/1971 | LeBlanc | 260/51.5 |
| 3,558,560 | 1/1971 | Huck et al. | 260/59 |
| 3,563,952 | 2/1971 | Schmoll | 260/59 |
| 3,678,103 | 7/1972 | Huck | 260/51.5 |
| 3,275,605 | 9/1966 | Eastes et al. | 260/51.5 |
| 3,309,341 | 3/1967 | Abrahams et al. | 260/70 |
| 3,489,718 | 1/1970 | Goullon et al. | 260/70 |
| 3,630,998 | 12/1971 | Schibler | 260/67.6 |
| 3,689,463 | 9/1972 | Kruglikov et al. | 260/70 |
| 3,645,973 | 2/1972 | Schibler | 260/67.6 |
| 3,090,665 | 5/1963 | Parsons et al. | 8/116.3 |
| 2,475,587 | 7/1949 | Bender et al. | 260/57 |

FOREIGN PATENTS OR APPLICATIONS 615,335   1/1949   Great Britain

OTHER PUBLICATIONS

Modern Plastics Encyclopedia, 1968, pp. 9, 13, 141–144, 183–184

Primary Examiner—Howard E. Schain
Attorney—Christensen & Sanborn

[57] ABSTRACT

Described herein are resin products having particular utility as rapid curing adhesives for wood and other materials, and processes fo making the resin compositions. These products are made by reacting an aldehyde condensation polymer containing reactive alkylol groups, such as a phenol-formaldehyde condensation polymer, with an acyl hydrazide. When the resulting acyl hydrazide-modified polymers are blended with an appropriate curing agent, such as an aldehyde, the compositions cure very rapidly at ambient temperatures. When pieces of wood or other materials are spread with the preferred resin compositions of this invention and brought into contact with another wood surface the bond strength develops within minutes. The durability, strength and flexibility of the adhesives of this invention under adverse weathering conditions are excellent.

46 Claims, No Drawings

RAPID CURING RESIN COMPOSITIONS COMPRISING A PHENOL-ALDEHYDE CONDENSATION POLYMER MODIFIED WITH AN ACYL HYDRAZIDE

BACKGROUND OF THE INVENTION

This invention relates to the preparation of rapid curing resin compositions, to the resin compositions per se, and to the use of these resin compositions as adhesives.

For many years the adhesives used to bond wood together to make plywood, laminated beams, furniture, etc., have employed aldehyde condensation polymers of phenol, urea, resorcinol, etc., such as phenol-formaldehyde resins, resorcinol-formaldehyde resins, phenol-resorcinol-formaldehyde resins, urea-formaldehyde resins, and others. Although each of these resins have advantageous characteristics, they all have relatively slow curing rates.

The slow cure rate of these resins has necessitated long press times with concurrent restriction on production when used in the manufacture of laminated beams and plywood and in other construction uses. To overcome the slow cure rates, many modifications of the above resins have been proposed. Other resins such as the epoxies have been proposed, but their expense and certain of their physical properties have limited their use. The adhesives of this invention employ aldehyde condensation polymers modified with particular acyl hydrazides. These resins not only have rapid cure rates but develop adequate adhesive bond strengths in a short amount of time at ambient temperature, thereby eliminating the need for long press times and application of heat to develop sufficient bond strength.

In U. S. Pat. No. 2,509,183, Auten describes thermosetting resins which are condensation products of an aldehyde, an alcohol and a particular group of symmetrical aliphatic dihydrazides. Some of the products are suggested as plywood adhesives, but the resins do not have the fast curing characteristics of the products of this invention.

SUMMARY OF THE INVENTION

This invention is directed to acyl hydrazide-modified aldehyde condensation polymers, to rapid curing resin compositions useful as adhesives, and to processes for the preparation thereof.

This invention is also directed to a method of bonding a plurality of members one to the other comprising applying to a surface of a first member a first component comprising an acyl hydrazide-modified polymer of this invention, applying to a surface of a second member a second component comprising a curing agent in an amount sufficient to cause said first component to become infusible, and assembling the first and second members so that the first and second components are brought into intimate reacting contact.

The acyl-hydrazide modified polymers of this invention are prepared by reacting together an aldehyde condensation polymer containing reactive alkylol groups and an acyl hydrazide containing at least two aldehyde-reactive sites located on amino, hydrazino and/or acyl hydrazido groups. A preferred class of such acyl hydrazides are those of Formula I set forth hereinafter.

The rapid curing resin compositions of this invention are prepared by blending a curing agent with the acyl hydrazide-modified polymer. The resin compositions rapidly set to an insoluble, infusible condition at ambient temperatures. Optionally, heat may be applied to further increase cure speed. The resins can be used to bond wood to wood, metal to metal, wood to metal, fabric, and many other materials where durable, moisture-resistant, heat-resistant adhesive compositions are needed.

DETAILED DESCRIPTION OF THE INVENTION

Many of the aldehyde condensation polymers of phenol, resorcinol, urea, and melamine having reactive alkylol groups have been widely used as adhesives and their properties are well known. "Polymers," as used herein, refers to resinous mixtures that do not crystallize or have a sharp melting point. "Reactive alkylol groups" are alkylol groups capable of reacting with the acyl hydrazides used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers are preferred: phenoplasts, aminoplasts, and ketone-aldehyde condensation polymers. They include such resins as the acid or base catalyzed phenol-aldehyde resins, urea-aldehyde resins, melamine-aldehyde resins and acetone-aldehyde resins. The following references disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press, Ltd., London, England; and British Patent 480,316.

Specifically, the aldehyde condensation polymers which can be used include (1) phenoplasts comprising the condensation polymers of an aldehyde such as formaldehyde with a phenolic type material having at least two positions ortho and/or para to the hydroxyl group open for reaction such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methyl isobutyl ketone formaldehyde, and the like. The preferred resins are water-soluble, liquid, thermosetting phenol-aldehyde resins.

A preferred resin is an ortho-condensed phenol-formaldehyde resin made by condensing 0.7 to 1.0 moles formaldehyde with 1 mole phenol in the presence of an ortho-directing catalyst such as calcium acetate. Such resins are known. Each of the aldehyde condensation polymers mentioned above is prepared and kept under conditions which prevent it from condensing to an infusible state by known methods. Although phenol is the preferred reactant, the phenolic resins may be modified by incorporating into them predetermined amounts of other monohydric phenols or dihydric phenols such as resorcinol, or other polyhydroxy aromatic compounds.

Exemplary of the aldehydes which can be used in preparation of the condensation polymer are formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid or alkaline catalyst or in the absence of a catalyst. When using acrolein, glyoxal, acetaldehyde, propionaldehyde or butyraldehyde, condensation is generally accomplished by combining the reactants in the presence of a strongly acid catalyst, neutralizing the reaction product, adding more aldehyde, and further reacting in the presence of a mildly acid, or alkaline, catalyst.

In accordance with this invention, the aldehyde condensation polymers containing reactive alkylol groups are modified by reaction with an acyl hydrazide containing at least two aldehyde-reactive functional groups, one of which is a carbohydrazide group and the second of which is an amino, hydrazino or carbohydrazide group. It is very desirable, in order to produce the low-temperature fast curing products of this invention, to first produce the aldehyde condensation polymer and then subsequently modify that polymer by reaction with the acyl hydrazide. Simultaneous reaction of all the reactants, e.g., phenol, formaldehyde and acyl hydrazide, generally produces an inferior, heterogeneous mass, e.g., comprising essentially a hydrazide-formaldehyde condensation polymer containing free phenol.

Exemplary of the class of acyl hydrazides useful in this invention are those of the formula:

(I) 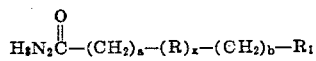

wherein $a$ and $b$ are integers of from 0 to 8 and the sum of $a$ and $b$ is from 0 to 12; $x$ is 0 or 1; R is —CH=CH—,

—O—, —S—, phenylene, biphenylene, naphthylene,

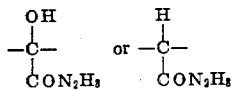

and $R_1$ is —NH$_2$, —N$_2$H$_3$ or

A preferred class of acyl hydrazides are those of the formula:

(II) 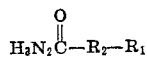

Wherein $R_1$ is —NH$_2$, —N$_2$H$_3$ or

and $R_2$ is —CH=CH—,

phenylene, biphenylene, naphthylene or —(CH$_2$)$_c$— where $c$ is an integer of from 0 to 8. Especially preferred are carbohydrazide, glutaric dihydrazide, adipic dihydrazide, sebacic dihydrazide and p-aminobenzoylhydrazide. Exemplary of other acyl hydrazides useful in this invention are oxalyl dihydrazide, malonic dihydrazide, succinic dihydrazide, azelaic dihydrazide, thiodipropionohydrazide, maleic dihydrazide, fumaric dihydrazide, itaconic dihydrazide, citric trihydrazide, terphthaloyl dihydrazide, 2,6-naphthalenedicarbohydrazide, 4,4'-biphenyl dicarbohydrazide, 2,2'-biphenyl dicarbohydrazide, o-amino-benzoylhydrazide, m-aminobenzoylhydrazide and glycine hydrazide.

Acyl hydrazides having the basic structure of Formula I, but further substituted with non-interfering substituents, are also useful in this invention. By "non-interfering substituents" is meant those substituents which do not detract from the usefulness of the acyl hydrazide in this invention. For example, hydroxyl, ether, alkyl, aryl, cyano, sulfide, and mercaptan groups are non-interfering substituents which could be attached to the carbon chain of the acyl hydrazides of Formula I without reducing their usefulness, i.e., without significantly changing resin shelf life or adhesive cure speed. An acyl hydrazide containing such a non-interfering substituent which is found to be satisfactory for purposes of this invention is 3-methylazelaic dihydrazide.

Also useful for purposes of this invention are the acid salts of the acyl hydrazides of formula I, which salts are formed by the reaction of such hydrazides with non-oxidizing acids such as the hydrohalide acids, sulphuric acid, phosphoric acid, acetic acid, propionic acid, butyric acid, and the like. These salts are equivalent, for purposes of this invention, to the free acyl hydrazides, and will normally be present in the reaction system when the aldehyde condensation polymer is reacted with the acyl hydrazide under acidic conditions.

The amount of hydrazide reacted with the condensation polymer generally ranges from about 0.05 to 2.0 parts, preferably 0.1 to 1.0 parts, by weight of the hydrazide to each part of the condensation polymer. More than 2.0 parts by weight of the hydrazide to each part of polymer can be used but there is usually little advantage in doing so. Most of the hydrazides disclosed react with the aldehyde condensation polymers at room temperature, but to insure complete reaction the mixtures are usually heated to reflux. Many of these reactions are exothermic in nature and cooling is required to control the reaction. This exothermic nature of the reaction is in some instances controlled by slow addition of the hydrazide to the prepared polymer. It may be desirable under some circumstances, however, to add the polymer to a solution of the acyl hydrazide.

The hydrazide-modified aldehyde condensation polymers make up the first component of the resin composition of this invention. The first component is prepared so as to have a relatively long storage life so it can be shipped and stored for fairly long periods of time without gelation. Various of the hydrazide-modified polymers can be stored for periods exceeding several months without adverse effect on their performance.

The second component of the resin composition is a curing agent which can be, for example, an alkylene donating compound, a diisocyanate, an epoxide, or an epoxide-aldehyde mixture, used either alone or in admixture with conventional thickening agents. Other materials that readily donate alkylene bridges to the polymer system are also generally suitable. The resin compositions are prepared immediately prior to use by blending together the hydrazide-modified aldehyde condensation polymer and the curing agent. Reaction takes place at ambient temperature and the blended mixture gels rapidly to an insoluble, infusible state. The preferred resin compositions of this invention set to an insoluble, infusible state within a few minutes. "Insoluble" is intended to mean not soluble in common solvents such as water, alcohols, ketones, hydrocarbons, esters, glycols, and the like. Optionally, heat may be applied to the curing composition if desired to further decrease the required cure time. Sufficient curing agent is added to the first component to form an insoluble, infusible product. The amount of curing agent is not critical and may range, for example, from 0.05 to 2.0 parts by weight per part of hydrazide-modified condensation polymer.

Although the reaction mechanism involved in the preparation of the resin compositions of this invention is not specifically known, it is believed that when an aldehyde is used as the curing agent, it reacts predominantly with the amino, hydrazino and/or carbohydrazide groups in the hydrazide-modified polymer.

The preferred curing agent is an aldehyde such as formaldehyde, though the formaldehyde-forming compounds polyoxymethylene, trioxane and paraformaldehyde are also quite satisfactory. Other aldehydes may be also used, for example, aliphatic or cyclic aldehydes having from 1 to 8 carbon atoms such as acrolein, glyoxal, acetaldehyde, proprionaldehyde, butyraldehyde, and furfuraldehyde. Phenolic resoles and other similar polymers having free methylol groups are also efficient curing agents. Suitable isocyanate curing agents include toluene diisocyanate, phenylene diisocyanate, 1,6-diisocyanatohexane, and the like. Suitable epoxy curing agents for use alone or in admixture with an aldehyde include diglycidyl ether of disphenol A, epoxidized phenolic novolacs, epoxidized polyglycols and the like.

When bonding materials together, the hydrazide-modified polymer and curing agent are kept separate until needed. Typically, they are then intimately mixed together and the resulting rapid curing resin composition of this invention is promptly spread on the materials to be bonded by any conventional means. An automatic mixing-dispensing gun is most useful in this regard. Certain of the resin compositions of this invention have such rapid cure times that they begin to cure before they can be spread on the material to be bonded. In such cases, the first component can be spread on one surface of the material to be bonded and the second component spread on the second surface to be bonded. Such a process is described in U. S. Pat. No. 2,557,826 using phenol-resorcinol-formaldehyde resins. When the surfaces are brought into contact the first and second components react forming an infusible glue line between the materials. If desired, other ingredients can be added to the resin compositions. Such ingredients include conventional fillers, pigments, plasticizers, and the like in amounts ordinarily employed for such purposes. The resin compositions of this invention do not need additional catalyst or heat to cure them. They are curable at ambient temperatures, most of them in very short time periods after mixing of the two components. Additionally the resin compositions develop bond strengths sufficient to hold articles together in a relatively short amount of time.

The following examples are provided by way of illustration only and are not intended to be limiting of the invention. All parts and percentages are by weight unless otherwise indicated.

EXAMPLE 1

This example illustrates the fast cure rates of the resin compositions of this invention. Cure rate is determined by means of "gel time." Gel time is determined by weighing out a 10-gm. aliquots of the first component, adjusting the pH's to the desired points, and mixing the second component with the first component. The time elapsed from mixing to gelling of the composition is termed "gel time."

A high-solids predominately ortho condensed phenol-formaldehyde polymer is prepared by mixing 43.06 parts by weight phenol, 4.51 parts water, 11.35 parts flake paraformaldehyde (91%) and 0.46 parts calcium acetate monohydrate. The mixture is brought to reflux (approximately 109°C.) in about 60 minutes at a uniform rate and held at reflux for 120 minutes. To separate 100-gram aliquots of this prepolymer are added 0.305 gram moles of each of the acyl hydrazides listed in Table 1. Each of the resulting mixtures is refluxed for 2.25 hours and cooled, and then 26.3 grams of methanol is stirred into each mixture. The methanol serves to stabilize the hydrazide-modified polymers and prevent any separation of water. 10-Gram aliquots of each of the resulting hydrazide-modified polymers are then weighed out, the pH's are adjusted to the desired values, and 2.5 ml. of a solution comprising 55 parts by weight formaldehyde in 35 parts methanol and 10 parts water is added to each aliquot. The mixtures are stirred rapidly until gelled and the times are recorded. The solution pH has some effect on the gel time of the resins. For most hydrazide-modified polymers the gel time decreases as the pH is lowered from about 8 to about 2. In general, variations in pH above 8 have little effect on gel times. The pH effect is dependent primarily on the particular acyl hydrazide employed, but it is also dependent on the solvent used and on the concentration of hydrazide in the modified polymer. Table 1 lists the hydrazides used and their structures, and the pH ranges over which similar gel times were observed.

TABLE 1

| Hydrazide | Structure | Gel, time | pH Range |
|---|---|---|---|
| Carbohydrazide | $\underset{H_3N_2CN_2H_3}{\overset{O}{\|}}$ | <150 seconds | 2.8–7.6 |
| Oxalyl dihydrazide | $\underset{H_3N_2C\ CN_2H_3}{\overset{O\ O}{\|\ \|}}$ | <100 seconds | 2.2–5.6 |

| Hydrazide | Structure | Gel. time | pH Range |
| --- | --- | --- | --- |
| Malonic dihydrazide | $H_3N_2\overset{O}{\overset{\|}{C}}CH_2\overset{O}{\overset{\|}{C}}N_2H_3$ | 75–95 seconds | 3.5–7.1 |
| Succinic dihydrazide | $H_3N_2\overset{O}{\overset{\|}{C}}(CH_2)_2\overset{O}{\overset{\|}{C}}N_2H_3$ | <100 seconds | 3.9–7.8 |
| Glutaric dihydrazide | $H_3N_2\overset{O}{\overset{\|}{C}}(CH_2)_3\overset{O}{\overset{\|}{C}}N_2H_3$ | <100 seconds | 2.8–7.5 |
| Azelaic dihydrazide | $H_3N_2\overset{O}{\overset{\|}{C}}(CH_2)_7\overset{O}{\overset{\|}{C}}N_2H_3$ | 85–105 seconds | 3.3–6.7 |
| Sebacic dihydrazide | $H_3N_2\overset{O}{\overset{\|}{C}}(CH_2)_8\overset{O}{\overset{\|}{C}}N_2H_3$ | 44 seconds–6 hours | 3.8–10.1 |
| Thiodipropriohydrazide | $(H_3N_2\overset{O}{\overset{\|}{C}}CH_2CH_2)_2S$ | 25–85 seconds | 2.8–6.9 |
| Maleic dihydrazide | $\begin{array}{c}\text{—}CON_2H_3\\ \|\\ \text{—}CON_2H_3\end{array}$ | 35–65 seconds | 3.8–7.2 |
| Fumaric dihydrazide | $\overset{O}{\overset{\|}{C}}N_2H_3$ ... $\overset{O}{\overset{\|}{C}}N_2H_3$ | 30–47 seconds | 3.8–7.4 |
| Itaconic dihydrazide | $CH_2=\overset{O}{\overset{\|}{C}}N_2H_3$ ; $H_2\overset{}{C}N_2H_3$ | 480–780 seconds | 3.3–7.8 |
| Citric trihydrazide | $H_2CCON_2H_3$ ; $HO-CCON_2H_3$ ; $H_2CCON_2H_3$ | 30–40 seconds | 3.1–5.8 |
| Terphthaloyl dihydrazide | $H_3N_2\overset{O}{\overset{\|}{C}}\text{—}C_6H_4\text{—}\overset{O}{\overset{\|}{C}}N_2H_3$ | Gelled during preparation | |
| 2,6-Naphthalenedicarbohydrazide | $H_3N_2OC\text{—naphthalene—}CON_2H_3$ | 7 minutes | 5.7 |
| 4,4'-Biphenyl dicarbohydrazide | $[H_2N_2\overset{O}{\overset{\|}{C}}\text{—}C_6H_4\text{—}]_2$ | Gelled during preparation | |
| 2,2'-Biphenyl dicarbohydrazide | $[\overset{O}{\overset{\|}{C}}N_2H_3\text{—}C_6H_4\text{—}]_2$ | >24 hours | 0.6–6.6 |
| o-Aminobenzoylhydrazide | $NH_2\text{—}C_6H_4\text{—}\overset{O}{\overset{\|}{C}}N_2H_3$ | 73–502 seconds | 3.5–10.5 |
| m-Aminobenzoyl hydrazide | $NH_2\text{—}C_6H_4\text{—}\overset{O}{\overset{\|}{C}}N_2H_3$ | 55 seconds | 6.2 |
| p-Aminobenzoylhydrazide | $NH_2\text{—}C_6H_4\text{—}\overset{O}{\overset{\|}{C}}N_2H_3$ | <100 seconds | 2.0–6.8 |

Gelation of the modified polymer during preparation indicates that the phenol-formaldehyde polymer and acyl hydrazide do react and that, using appropriate concentrations and reaction conditions, a suitable modified prepolymer can be obtained.

EXAMPLE 2 a. To separate 100-gram aliquots of a high solids phenol-formaldehyde prepolymer prepared as described in Example 1 are added 0.305 moles of each of the acyl hydrazides listed in Table 2. Each of the mixtures is refluxed for 2.25 hours and cooled. Then 26.3 grams of methanol is stirred into each of the resulting hydrazide-modified phenol-formaldehyde polymers.

b. Ten-gram aliquots of each of the modified phenol-formaldehyde polymers prepared as described above and weighed out. To selected aliquots there is added an amount of concentrated HCl as indicated in Table 2 below. 5 grams of one of three curing agents, as indicated in Table 2, are then added to each aliquot. The curing agents are:

A. a mixture of 49.08 parts of a solution consisting of 55 parts formaldehyde in 35 parts methanol and 10 parts water, 1.84 parts of a powdered, refined chrysotile asbestos (R.G. 244 asbestos — a product of Union Carbide Corp.), and 49.08 of an epoxidized phenol-formaldehyde novolac resin having an average of 2.2 epoxy groups per molecule (D.E.N. 431 — a product of Dow Chemical Co.);

B. a mixture of 96.39 parts and 3.61 parts of the above-mentioned formaldehyde-methanol-water solution and asbestos, respectively; and C. 49.08 parts and 1.84 parts of the formaldehyde-methanol-water solution and asbestos, respectively, and 49.08 parts of a diglycidyl ether of propylene glycol having an epoxy equivalent of 364 to 380 and a viscosity of 25,000 to 45,000 cps. at 25°C. (D.E.R. 741 — a product of Dow Chemical Co.).

After the addition of the curing agent, each aliquot is stirred rapidly and a sample is promptly removed and used in a standard cross lap test. (See Marra, A., "Geometry as an Independent Variable in Adhesive Joint Studies," Forest Products Journal, Vol. XII, No. 2, pp. 81–90, 1962.) Stirring of the remaining portion of each aliquot is continued until gelling has occurred. Gel times are recorded in Table 2.

The cross-lap test is conducted by spreading the sample on the central area of a piece of Douglas fir wood 1 inch wide by approximately ¾ inch thick and 2-¾ inches long. A similar piece of Douglas fir wood is immediately laid over the first with the grain direction at right angles. A measured quantity of adhesive may be used or an excess may be applied with the surplus resin allowed to squeeze out of the joint. The latter method has been used for the examples given here. As soon as the cross-lap is laid on the first piece, a pressure of 40 pounds is applied for the desired length of time at ambient temperatures. The joint is then broken in tension, the bond strength being recorded in Table 2.

Nromally, wood failure begins to occur at a value of about 150 psi. For many purposes, however, a bond strength well below this value is wholly satisfactory. It should also be noted that strength usually continues to increase significantly for at least a 24-hour period after initial assembly.

TABLE 2

| Acyl hydrazide | curing agent | Gm. HCl/10 gm. polymer | Gel-Time (sec.) | press time (min.) | tensile Break (psi) |
|---|---|---|---|---|---|
| carbo hydrazide | A | - | 105 | 12 | 200 |
|  | A | 1.4 | 105 | 6 | 45 |
|  | A | 2.0 | 15 | 6 | 215 |
|  | B | - | 65 | 12 | 210 |
|  | B | 1.4 | 20 | 6 | 65 |
| oxalyl di-hydrazide | A | - | 50 | 12 | 35 |
|  | B | - | 40 | 12 | 20 |
| malonic di-hydrazide | A | - | 100 | 12 | 124 |
|  | B | - | 40 | 12 | 71 |
| succinic di-hydrazide | A | - | 70 | 8 | 75 |
|  | B | - | 50 | 8 | 15 |
| glutaric di-hydrazide | A | - | 50 | 4 | 65 |
|  | B | - | 40 | 4 | 75 |
|  | C | - | 60 | 6 | 275 |
| adipic dihydrazide | A | - | 200 | 10 | 105 |
|  | B | - | >360 | 10 | 45 |
|  | C | - | 390 | 10 | 25 |
| azelaic di-hydrazide | A | - | 180 | 12 | 138 |
|  | B | - | 60 | 12 | 64 |
| sebacic di-hydrazide | A | - | 70 | 12 | 110 |
|  | B | - | >420 | 12 | 45 |
| Thiodi-propiono-hydrazide | A | - | 180 | 12 | 90 |
|  | B | - | 200 | 12 | 73 |
| maleic Di-hydrazide | A | 0.5 | 120 | 12 | 139 |
|  | B | 0.5 | 35 | 12 | 50 |
| fumaric di-hydrazide | A | 0.5 | 65 | 12 | 132 |
|  | B | 0.5 | 25 | 12 | 45 |
| Itaconic Di-hydrazide | A | - | 300 | 12 | 92 |
|  | B | - | 30 | 12 | 42 |
| Citric Tr-hydrazide | A | 1.0 | 35 | 12 | 101 |
|  |  | 1.0 | 17 | 12 | 50 |
| isophthaloyl Dihydrazide | A | - | 120 | 12 | 102 |
|  | B | - | 75 | 12 | 132 |
| o-Aminobenzoyl-hydrazide | A | - | 115 | 12 | 140 |
|  | B | - | 55 | 12 | 90 |
| m-Aminobenzoyl hydrazide | B | - | 35 | 12 | 25 |
| p-Aminobenzoyl-hydrazide | A | - | 90 | 6 | 45 |
|  | A | - | 90 | 12 | 305 |
|  | B | - | 50 | 10 | 115 |
|  | C | - | 90 | 8 | 110 |
| glycine hydrazide | A | - | 30 | 12 | 125 |
|  | B | - | 10 | 12 | 40 |
| 1,1,2-ethane tricarbo-hydrazide | A | - | 180 | 12 | 162 |
|  | B | - | 162 | 12 | 89 |

EXAMPLE 3

A series of hydrazide-modified urea-formaldehyde polymers are prepared by mixing together three parts of a urea-formaldehyde resin (Amres 255 — a product of Pacific Resins and Chemicals, Inc.), one part of an acyl hydrazide listed in Table 3 below, and 10 parts of N,N-dimethylformamide (DMF). The samples are warmed and stirred until homogeneous. Where DMF was not needed to dissolve the mixture of polymer and hydrazide, it was omitted as indicated in Table 3. Amres 255 is typical of many general purpose urea-formaldehyde adhesive resins readily available on the market. It is made with an approximate 2 to 1 mole ratio of formaldehyde to urea and is cooked to a Gardner viscosity of "U" at pH of 8.0 and contains 65% resin solids in a water solution.

Part (b) of Example 2 is repeated substituting for the modified phenol-formaldehyde polymers the modified urea-formaldehyde polymers prepared as described above. The gel times observed and the results of the cross-lap tests are shown in Table 3.

TABLE 3

| Acyl hydrazide | DMF | Curing agent | Gm. HCl/ 10 gm. polymer | Gel-time, sec. | Press time, min. | Tensile break, P.s.i. |
|---|---|---|---|---|---|---|
| Carbohydrazide | Yes | A | 1.2 | 70 | 12 | 375 |
|  | Yes | B | 0.8 | 80 | 12 | 305 |
| Glutaric dihydrazide | No | A | 0.4 | 120 | 12 | 205 |
|  | No | B | 0.4 | 80 | 12 | 375 |
|  | No | C | 0.2 |  | 12 | 85 |
| Adipic dihydrazide | No | A |  | 160 | 12 | 130 |
|  | No | B |  | 155 | 12 | 135 |
|  | No | C |  | 130 | 12 | 130 |

EXAMPLE 4

A series of hydrazide-modified melamine-urea-formaldehyde polymers are prepared by mixing together three parts of a melamine-urea-formaldehyde resin (Melurac 400 — a product of American Cyanamid Company), one part of an acyl hydrazide listed in Table 4, and 20 parts of N,N-dimethylformamide (DMF). The samples were warmed and stirred until homogeneous. Melurac 400 is a 100% solids, spray-dried adhesive resin typical of many similar products commercially available which are intended for hot press or radio frequency bonding of wood products. Resins of this type are described in British Patent 480,316.

Part (b) of Example 2 is then repeated substituting for the modified phenol-formaldehyde polymers the modified melamine-urea-formaldehyde polymers prepared as described above. The gel times observed and the results of the cross-lap tests are shown in Table 4.

TABLE 4

| Acyl hydrazide | curing Agent | gm HCl/ 10 gm Polymer | Gel-Time (sec.) | Press Time (min.) | Tensile Break (P.S.T.) |
|---|---|---|---|---|---|
| carbo-hydrazide | A | 0.67 | 45 | 12 | 100 |
|  | B | - | -- | 12 | 5 |
| glutaric Dihydrazide | A | 0.4 | -- | 12 | 15 |
|  | C | 0.4 | -- | 12 | 30 |
| adipic Dihydrazide | A | 0.6 | -- | 12 | 25 |
|  | B | 0.6 | 100 | 12 | 35 |

EXAMPLE 5

An acetone-formaldehyde polymer containing about 2% of free formaldehyde is prepared by charging 17746 gm. of 50% formalin, 1270 gm. water and 4173 gm. of acetone into a 5-gallon reactor. The temperature of the mixture is adjusted to 40°C. and 45.4 gm. of 49.5% sodium hydroxide is added with agitation. The mix is further cooled to 30°C. and a second 45.4 gm. portion of 49.5% sodium hydroxide is added. The temperature is then allowed to rise uniformly to 65°C. over the next hour using cooling as required to control the exotherm. After reaching the maximum temperature the mixture is held at 65°–70°C. for an additional 20 minutes until the exotherm has completely subsided.

Three parts of the acetone-formaldehyde resin and one part of either sebacic dihydrazide or glutaric dihydrazide are mixed together and warmed on a steam bath for one-half hour. Ten gram aliquots of each of the resulting hydrazide-modified polymers are adjusted to the pH's indicated in Table 5 using concentrated HCl.

Into each aliquot is then stirred 2.5 gm. of a curing agent consisting of a solution 55 parts formaldehyde in 35 parts methanol and 10 parts water. Gel times and tensile break strengths determined as in Example 2 are recorded in Table 5.

TABLE 5

| Acyl hydrazide | pH | Gel time (sec.) | Press Time (min.) | Tensil Break (P.S.I.) |
|---|---|---|---|---|
| glutaric Dihydrazide | 6.0 | 270 | – | -- |
|  | 4.0 | 120 | 12 | 40 |
|  | 2.4 | 30 | – | -- |
| sebacic Dihydrazide | 6.7 | >30 min. | – | -- |
|  | 3.2 | 105 | 60 | 290 |
|  | 1.4 | 10 | – | – |

EXAMPLE 6

To 100 gm. of a phenol-formaldehyde polymer prepared as described in Example 1 is added 0.305 moles of glutaric dihydrazide. The resulting mixture is refluxed for 2.25 hours and then cooled. 26.3 Grams of methanol is stirred into the resulting modified polymer.

To 5.0 parts of this modified polymer is added 1.48 parts of toluene diisocyanate. The mixture gels after 30 seconds of rapid stirring.

What is claimed is:

1. An acyl hydrazide-modified condensation polymer comprising the reaction product of a phenoplast containing reactive alkylol groups with an acyl hydrazide of the formula

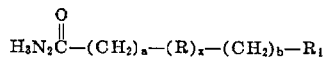

wherein $a$ and $b$ are integers of from 0 to 8 and the sum of $a$ and $b$ is from 0 to 12; $x$ is 0 or 1; R is —CH=CH—,

—O—, —S—, phenylene, biphenylene, naphthylene,

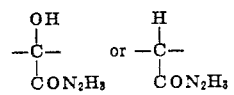

and $R_1$ is —NH$_2$, —N$_2$H$_3$ or

said reaction product being further reactable with a curing agent to form an insoluble, infusible polymer.

2. The modified polymer of claim 1 wherein from 0.05 to 2.0 parts by weight of said acyl hydrazide is reacted with 1 part by weight of said phenoplast.

3. The modified polymer of claim 1 wherein said phenoplast is one comprising formaldehyde condensed with phenol, cresol, xylenol, phenol-resorcinol or resorcinol.

4. The modified polymer of claim 3 wherein from 0.05 to 2.0 parts by weight of said acyl hydrazide is reacted with 1 part by weight of said phenoplast.

5. The modified polymer of claim 1 wherein said phenoplast comprises phenol condensed with formaldehyde.

6. The modified polymer of claim 5 wherein from 0.05 to 2.0 parts by weight of said acyl hydrazide is reacted with 1 part by weight of said phenoplast.

7. The modified polymer of claim 1 wherein said acyl hydrazide is selected from those of the formula $$H_2N_2\overset{O}{\overset{\|}{C}}-R_2-R_1$$

wherein $R_1$ is $-NH_2$, $-N_2H_3$ or $$-\overset{O}{\overset{\|}{C}}N_2H_3;$$

and $R_2$ is $-CH=CH-$, $$-\overset{CH_2}{\overset{\|}{C}}-,$$

phenylene, biphenylene, naphthylene or $-(CH_2)_c-$ where $c$ is an integer of from 0 to 8.

8. The modified polymer of claim 7 wherein from 0.05 to 2.0 parts by weight of said acyl hydrazide is reacted with 1 part by weight of said phenoplast.

9. The modified polymer of claim 7 wherein said phenoplast is one comprising formaldehyde condensed with phenol, cresol, xylenol, phenol-resorcinol or resorcinol.

10. The modified polymer of claim 9 wherein from 0.05 to 2.0 parts by weight of said acyl hydrazide is reacted with 1 part by weight of said phenoplast.

11. The modified polymer of claim 7 wherein said phenoplast comprises phenol condensed with formaldehyde.

12. The modified polymer of claim 11 wherein from 0.05 to 2.0 parts by weight of said acyl hydrazide is reacted with 1 part by weight of said phenoplast.

13. The modified polymer of claim 1 wherein said acyl hydrazide is adipic dihydrazide, glutaric dihydrazide, sebacic dihydrazide, carbohydrazide, or p-aminobenzoylhydrazide.

14. The modified polymer of claim 13 wherein from 0.05 to 2.0 parts by weight of said acyl hydrazide is reacted with 1 part by weight of said phenoplast.

15. The modified polymer of claim 13 wherein said phenoplast is one comprising formaldehyde condensed with phenol, cresol, xylenol, phenol-resorcinol or resorcinol.

16. The modified polymer of claim 15 wherein from 0.05 to 2.0 parts by weight of said acyl hydrazide is reacted with 1 part by weight of said phenoplast.

17. The modified polymer of claim 13 wherein said phenoplast comprises phenol condensed with formaldehyde.

18. The modified polymer of claim 17 wherein from 0.05 to 2.0 parts by weight of said acyl hydrazide is reacted with 1 part by weight of said phenoplast.

19. A rapid curing adhesive composition comprising
a. an acyl hydrazide-modified condensation polymer comprising the reaction product of a phenoplast containing reactive alkylol groups with an acyl hydrazide of the formula $$H_2N_2\overset{O}{\overset{\|}{C}}-(CH_2)_a-(R)_x-(CH_2)_b-R_1$$

wherein $a$ and $b$ are integers of from 0 to 8 and the sum of $a$ and $b$ is from 0 to 12; $x$ is 0 to 1; R is $-CH=CH-$, $$-\overset{CH_2}{\overset{\|}{C}}-,$$

$-O-$, $-S-$, phenylene, biphenylene, naphthylene, $$-\overset{OH}{\underset{CON_2H_3}{\overset{|}{C}}}-\quad\text{or}\quad -\overset{H}{\underset{CON_2H_3}{\overset{|}{C}}}-\quad;$$

and $R_1$ is $-NH_2$, $-N_2H_3$ or $$-\overset{O}{\overset{\|}{C}}N_2H_3;$$

and
b. a curing agent reactable with said modified condensation polymer to form an insoluble, infusible polymer.

20. The composition of claim 19 wherein said curing agent comprises an alkylene donating compound, a diisocyanate, an epoxide or an epoxide-aldehyde mixture.

21. The composition of claim 19 wherein said curing agent comprises an aldehyde.

22. The composition of claim 19 wherein said curing agent comprises formaldehyde.

23. The composition of claim 19 wherein the amount of curing agent is from 0.05 to 2.0 parts by weight per part by weight of said modified condensation polymer.

24. The composition of claim 19 wherein said phenoplast comprises phenol condensed with formaldehyde.

25. The composition of claim 24 wherein said acyl hydrazide is adipic dihydrazide, glutaric dihydrazide, sebacic dihydrazide, carbohydrazide or p-aminobenzoylhydrazide.

26. The composition of claim 19 wherein said acyl hydrazide is selected from those of the formula $$H_2N_2\overset{O}{\overset{\|}{C}}-R_2-R_1$$

wherein $R_1$ is $-NH_2$, $-N_2H_3$ or $$-\overset{O}{\overset{\|}{C}}N_2H_3;$$

and $R_2$ is $-CH=CH-$, $$-\overset{CH_2}{\overset{\|}{C}}-,$$

phenylene, biphenylene, naphthylene, or $-(CH_2)_c$ where $c$ is an integer of from 0 to 8.

27. The composition of claim 26 wherein said curing agent is an alkylene donating compound.

28. The composition of claim 26 wherein said phenoplast is one comprising formaldehyde condensed with phenol, cresol, xylenol, phenol-resorcinol or resorcinol.

29. The composition of claim 28 wherein said acyl hydrazide is adipic dihydrazide, glutaric dihydrazide, sebacic dihydrazide, carbohydrazide or p-aminobenzoylhydrazide.

30. A process for the preparation of a rapid curing adhesive composition comprising blending together a. an acyl hydrazide-modified condensation polymer comprising the reaction product of a phenoplast containing reactive alkylol groups with an acyl hydrazide of the formula

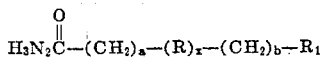

wherein $a$ and $b$ are integers of from 0 to 8 and the sum of $a$ and $b$ is from 0 to 12; $x$ is 0 or 1; R is $-CH=CH-$,

$-O-$, $-S-$, phenylene, biphenylene, naphthylene,

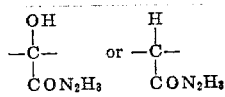

and $R_1$ is $-NH_2$, $-N_2H_3$ or

and b. a curing agent reactable with said modified condensation polymer to form an insoluble, infusible polymer.

31. The process of claim 30 wherein said curing agent comprises an alkylene donating compound, a diisocyanate, an epoxide or an epoxide-aldehyde mixture.

32. The process of claim 30 wherein said curing agent comprises an aldehyde.

33. The process of claim 30 wherein said curing agent comprises formaldehyde.

34. The process of claim 30 wherein the amount of curing agent is from 0.05 to 2.0 parts by weight per part by weight of said modified condensation polymer.

35. The process of claim 30 wherein said phenoplast comprises phenol condensed with formaldehyde.

36. The process of claim 35 wherein said acyl hydrazide is adipic dihydrazide, glutaric dihydrazide, sebacic dihydrazide, carbohydrazide or p-aminobenzoylhydrazide.

37. The process of claim 20 wherein said phenoplast is one comprising formaldehyde condensed with phenol, cresol, xylenol, phenol-resorcinol or resorcinol.

38. The process of claim 37 wherein said acyl hydrazide is adipic dihydrazide, glutaric dihydrazide, sebacic dihydrazide, carbohydrazide or p-aminobenzoylhydrazide.

39. A process for producing a modified condensation polymer comprising reacting a phenoplast containing reactive alkylol groups with an acyl hydrazide of the formula

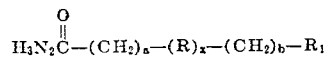

wherein $a$ and $b$ are integers of from 0 to 8 and the sum of $a$ and $b$ is from 0 to 12; $x$ is 0 or 1; R is $-CH=CH-$,

$-O-$, $-S-$, phenylene, biphenylene, naphthylene,

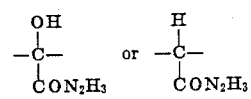

and $R_1$ is $-NH_2$, $-N_2H_3$ or

said modified polymer being further reactable with a curing agent to form an insoluble, infusible polymer.

40. The modified polymer of claim 39 wherein from 0.1 to 1.0 parts by weight of said acyl hydrazide is reacted with 1 part by weight of said phenoplast.

41. The process of claim 39 wherein said phenoplast is one comprising formaldehyde condensed with phenol, cresol, xylenol, phenol-resorcinol or resorcinol.

42. The process of claim 41 wherein from 0.1 to 1.0 parts by weight of said acyl hydrazide is reacted with 1 part by weight of said phenoplast.

43. The process of claim 41 wherein said acyl hydrazide is selected from those of the formula

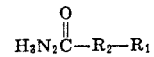

wherein $R_1$ is $-NH_2$, $-N_2H_3$ or

and $R_2$ is $-CH=CH-$,

phenylene, biphenylene, naphthylene or $-(CH_2)_c-$ where $c$ is an integer of from 0 to 8.

44. The process of claim 43 wherein from 0.1 to 1.0 parts by weight of said acyl hydrazide is reacted with 1 part by weight of said phenoplast.

45. The process of claim 41 wherein said acyl hydrazide is adipic dihydrazide, glutaric dihydrazide, sebacic dihydrazide, carbohydrazide, or p-aminobenzoylhydrazide.

46. The process of claim 45 wherein from 0.1 to 1.0 parts by weight of said acyl hydrazide is reacted with 1 part by weight of said phenoplast.

* * * * *